Jan. 12, 1960  H. A. DROKE  2,920,482
SPRING TESTING TOOL
Filed April 12, 1956

INVENTOR.
HERMAN A. DROKE
BY
Albert J. Kramer
ATTORNEY

United States Patent Office 2,920,482
Patented Jan. 12, 1960

2,920,482
SPRING TESTING TOOL

Herman A. Droke, Kingsport, Tenn.

Application April 12, 1956, Serial No. 577,838

3 Claims. (Cl. 73—161)

This invention relates to testing tools and is more particularly concerned with devices for determining the pressure or force of springs, especially coil springs and more especially coil springs on the valves of piston engines of the valve-in-head type.

One of the objects of this invention is the provision of a testing tool of the type mentioned, which is simple and rugged in construction, which has only a few moving parts, and which is easy to use by a single person.

In actual use of spring gauging tools, it is important that the tool be capable of undergoing hard usage. Also, the instrument must be capable of being used quickly and efficiently and by a single person in order to conserve the valuable time of mechanics and of repair shops in repairing an engine. Such features are inherent in devices made accordingly to the present invention.

Another object of the invention is the provision of such a device which can be used to test the valve springs while the valves are in place in the engine, so that the exact force required to open the valves can be determined in situ and hence include the factors, in addition to the tension of the springs, which affect the force required to open the valves, such as friction along the valve stem.

In testing the tension of engine valve springs, it is important that the tests be applied to the precise conditions existing in the engine so that proper adjustments can be made to give proper and uniform operating conditions. Otherwise, the engine will not operate correctly and, in fact, damage to the engine may be done, such as by burning of the valves when the operation of the valves is too slow.

These and other objects, advantages and features of the invention will appear more fully from the following description considered together with the accompanying drawing.

Figure 1:
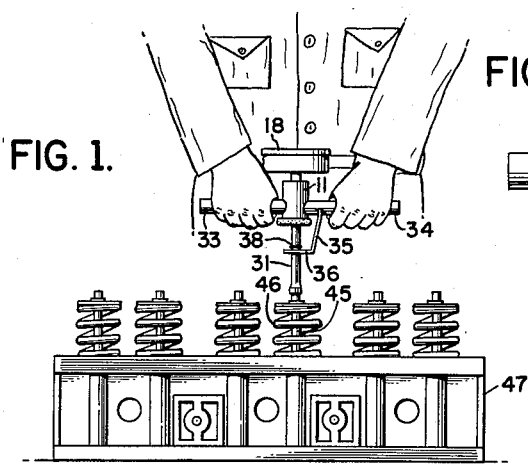
Fig. 1 is an elevational view of an embodiment of the invention as it appears in actual use by a person in connection with an automobile engine block.

Referring with more particularity to the drawing in which like numerals designate like parts, the embodiment illustrated comprises a hydraulic cylinder 11 one end of which is closed by a solid wall 12 integral therewith and the other end has a movable wall or piston 13.

The wall 12 has a threaded aperture 14 therethrough to receive one end 15 of an elbow pipe 16. The other end 17 of the pipe 16 is connected to a conventional liquid pressure gauge 18.

The movable wall 13 has a central portion 19 projecting inwardly about which there is disposed a double walled rubber sealing ring 20.

The inner wall 21 and outer wall 22 of the sealing ring 20 are connected together by a web portion 23. The inner ends of the walls 21 and 22 are separated by an annular wedge 24 integral with a metal ring 25 slidably engaged with the central portion 19.

The inner side of the ring 25 has a recessed portion 26 which is a seat for one end of a coil spring 27 disposed in the space between the ring 25 and the wall 12. The spring 27 is under compression and thus acts to urge the piston 13 outwardly and at the same time, through the action of the wedge 24 spreads the walls of the sealing ring to force the outer wall 22 in sealing engagement with the inner surface of the cylinder 11.

The piston 13 is prevented from moving completely out of the cylinder under the action of the spring 27 by a removable split retainer ring 28.

The outer side of the piston 13 has a concave or recessed central portion 29 which acts as a socket for the inner end 30 of a push bar 31.

The interior of the cylinder 11 is filled with a hydraulic fluid 32 which communicates with fluid in the gauge 18 through the elbow 16.

To the exterior of the cylinder 11 there is rigidly secured a pair of diametrically projecting handle bars 33 and 34 for the application of force to the device axially of the cylinder 11. One of these handles, say handle 34, has one end of a bracket 35 anchored thereto. The bracket extends therefrom alongside the push bar 31 and terminates in a flat portion 36 in a plane transverse to the push bar, beyond the end of the cylinder 11. Also, it has an aperture 37 aligned with the push bar to slidably engage and support the push bar.

The push bar is provided with an annular groove on the cylinder side of the portion 36, to receive a removable retaining ring 38 and hence prevent the push bar from falling out of its normal position.

The open end of the cylinder 11 is also provided with a safety rubber cap 39 which has an annular edge 40 in engagement with an exterior annular groove 41 on the cylinder, and a central hollow portion 42 slidably engaged with the push bar 31.

The outer end of the push bar 31 is concave or cupped to provide a socket 43 for engaging the end 44 of a valve stem 45 under tension of a valve spring 46 in a piston engine 47.

Figure 2:
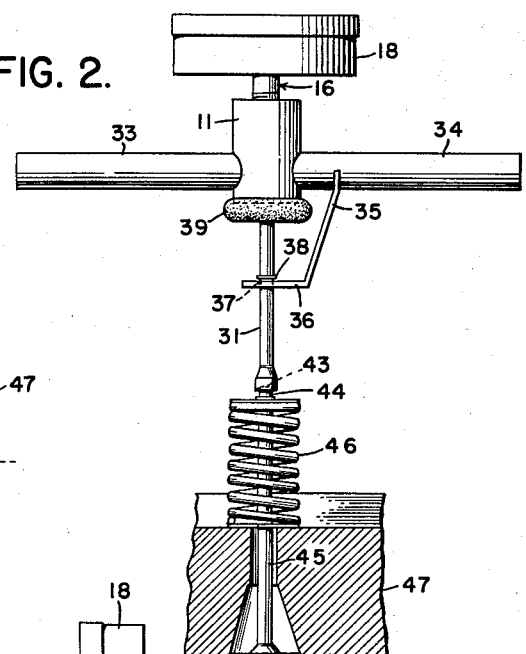
Fig. 2 is an elevational view of the embodiment on a larger scale in conjunction with a fragmentary portion of the engine.
Figure 3:
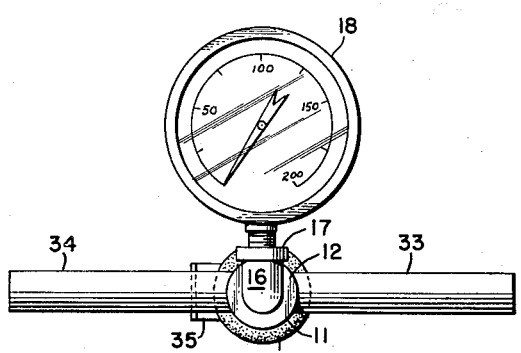
Fig. 3 is a top plan view of the embodiment.
Figure 4:
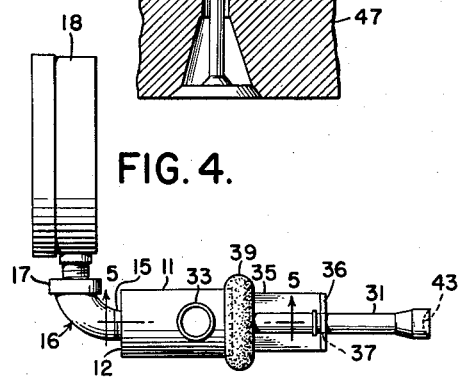
Fig. 4 is a side view of the same embodiment.
Figure 6:
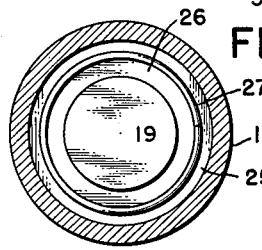
Fig. 6 is a cross-sectional view along the line 6—6 of Fig. 5.
Figure 5:
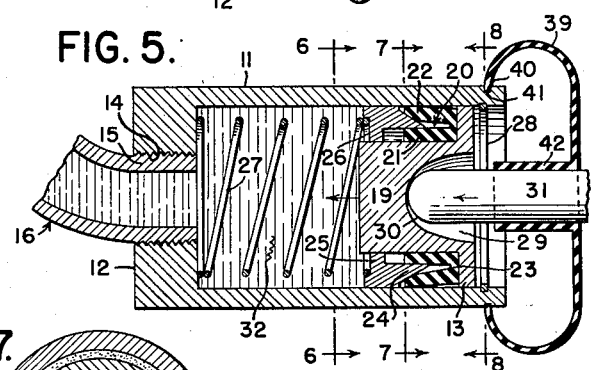
Fig. 5 is a longitudinal sectional view on a still larger scale, along the line 5—5 of Fig. 4.
Figure 8:
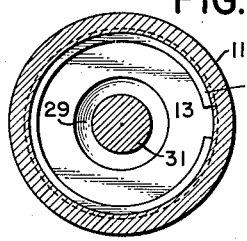
Fig. 8 is a cross-sectional view along the line 8—8 of Fig. 5.
Figure 7:
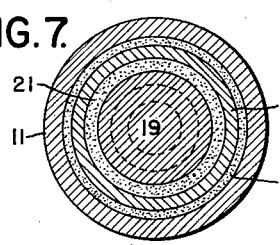
Fig. 7 is a cross-sectional view along the line 7—7 of Fig. 5.

To use the device, the socket 43 is engaged with a valve stem, as shown in Figs. 1 and 2, and a downward force is applied by the hands of the operator against the handles 33 and 34 until the valve opens. In this position of the device, the face of the gauge 18, due to the use of the elbow pipe 16, is directly in front of the operator and can be read directly by him. It is apparent, therefore, that the use of the device is rapid and efficient and that only one person is required to use it. As a result, prompt adjustments can be made by installing new springs or by the addition of shims between the bottom end of spring and cylinder head to obtain correct valve spring pressure.

Having thus described my invention, I claim:

1. A testing tool comprising a hydraulic cylinder having a fixed end wall and a movable end wall, a gauge carried by the fixed end wall and hydraulically connected to the interior of the cylinder, a slidable push bar carried by the cylinder adjacent the outer side of the movable wall for abutting engagement therewith and in alignment with its direction of travel, said push bar having a socket for engaging the end of a valve stem, means within the cylinder for biasing the movable wall outwardly and a cross bar connected to the cylinder and extending on either side thereof for the application of a force axially of the cylinder by the hands of a person.

2. A testing tool comprising a hydraulic cylinder having a fixed end wall and a movable end wall, an elbow pipe carried by and having one end connected to the fixed end wall, a gauge connected to the other end of and carried by the elbow pipe, a slidable push bar carried by the cylinder adjacent the outer side of the movable wall for abutting engagement therewith and in alignment with its direction of travel, said push bar having a socket for engaging the end of a valve stem, means within the cylinder for biasing the movable wall outwardly, and a cross bar connected to the cylinder and extending on either side thereof for the application of a force axially of the cylinder by the hands of a person.

3. A testing tool comprising a hydraulic cylinder having a fixed end wall and a movable end wall, an elbow pipe carried by and having one end connected to the fixed end wall, a gauge connected to the other end of and carried by the elbow pipe, a slidable push bar carried by the cylinder adjacent the outer side of the movable wall for abutting engagement therewith and in alignment with its direction of travel, said push bar having a socket for engaging the end of a valve stem, means within the cylinder for biasing the movable wall outwardly, and handle bars rigidly connected to the cylinder and extending on either side thereof for the manual application of force axially of the cylinder by the hands of a person.

References Cited in the file of this patent
UNITED STATES PATENTS

| | | |
|---|---|---|
| 680,371 | Brittan | Aug. 13, 1901 |
| 1,822,587 | Essen | Sept. 8, 1931 |
| 1,825,491 | Walters | Sept. 29, 1931 |
| 2,117,985 | Ridenour | May 17, 1938 |
| 2,680,967 | Newman | June 15, 1954 |